United States Patent [19]

Hosie

[11] Patent Number: 4,853,553
[45] Date of Patent: Aug. 1, 1989

[54] DUAL MODE DIESEL ELECTRIC POWER SYSTEM FOR VEHICLES

[76] Inventor: Alan P. Hosie, Box 32, Group 6, RR 1, St. Norbert, Manitoba, Canada

[21] Appl. No.: 115,840

[22] Filed: Oct. 30, 1987

[51] Int. Cl.$^4$ ............................................. B60L 11/08
[52] U.S. Cl. .................................. 290/40 C; 290/40 R
[58] Field of Search ................. 290/40 A, 40 B, 40 C, 290/40 R, 51; 322/14

[56] References Cited

U.S. PATENT DOCUMENTS

| | | | |
|---|---|---|---|
| 3,701,556 | 10/1972 | Richmond | 290/40 B |
| 4,482,813 | 11/1984 | Grand-Perret et al. | 290/40 R |
| 4,498,016 | 2/1985 | Earleson et al. | 290/40 R |
| 4,577,603 | 3/1986 | Murakami et al. | 290/40 A X |
| 4,633,093 | 12/1986 | Otobe et al. | 290/40 B X |
| 4,634,887 | 1/1987 | Balch et al. | 290/40 C X |

*Primary Examiner*—William M. Shoop, Jr.
*Assistant Examiner*—W. E. Duncanson, Jr.
*Attorney, Agent, or Firm*—Irell & Manella

[57] ABSTRACT

A diesel-electric propulsion and operating system may be used alone or in combination with another power supply. It has particular application to a dual mode, trolley and diesel bus. The diesel engine is controlled to supply only that power demanded by the electrical systems, including the traction motor, and to operate on a fixed power curve. This provides an optimized efficiency. Other novel characteristics include a two-speed drive axle limited to the mode selector, a backup hydraulic motor and pump, a dual mode passenger compartment tester, and a diesel engine pretester.

2 Claims, 8 Drawing Sheets

DUAL MODE DIESEL ELECTRIC POWER SYSTEM FOR VEHICLES

BACKGROUND

The two conventional propulsion systems for public transport buses are internal combustion, usually diesel, engines and direct current electric motors supplied with power from overhead trolley lines. An alternating current electric system is also available from Stromberg Industrial Systems of Helsinki, Finland. This is a trolley bus system in which the DC supplied is converted by a variable voltage, variable frequency, pulse width modulated inverter into an alternating current for driving a three phase AC traction motor. Another known system is the "dual mode" system using two separate drive systems, one electric and the other internal combustion. The use of two complete propulsion systems leads to numerous problems, including excessive weight, dual controls and the like.

Recently, a system has been developed that employs a diesel engine-alternator/rectifier system for supplying DC power to a Stromberg type AC electric propulsion system. A system of this sort, set up as a "dual mode" system with DC power coming from either the engine-alternator or overhead trolleys has been constructed as a prototype. With that system, the diesel engine and the main power inverter were both controlled according to an input from the operator through an accelerator pedal. The diesel engine was therefore operated according to the speed and power demanded by the operator and not according to the power requirements of the system to meet the operator's demands.

The present invention is concerned with improvements relating to this and other aspects of a vehicle of this last mentioned type.

SUMMARY

According to one aspect of the present invention there is provided a control system for controlling an electric generating apparatus including a combustion engine and an electricity generating means driven by the combustion engine, said control system comprising:

an engine governor means responsive to a control signal for controlling the operation of the engine;

a command signal generator generating a selectively variable command signal;

an engine power signal generating means for generating an engine power signal representing power available from the engine;

an electric power demand monitoring means generating a power demand signal representing the electric power being supplied by the electricity generating means to other equipment;

first comparing means for comparing the engine power signal and the command signal and producing an engine power deficiency signal representing the difference between engine power available and electric power required by the command signal;

second comparing means for combining the engine power deficiency signal with the power demand signal and generating a feedback signal;

selector means comparing the command signal and the feedback signal and passing whichever signal is the lowest to the engine governor means as the control signal.

Preferably the electricity generating means is an alternator with a field-forcing voltage regulator producing an exciter control voltage, and a signal converter converting the excitor control voltage to a low speed control signal that is supplied to the engine governor as a control signal in the absence of a command signal. This allows the diesel engine to operate at a low idle while supplying power for auxiliary systems. In the absence of such a control, the engine must be operated at a high idle speed, sufficient to produce enough power to supply all of the auxiliaries that may be operated.

According to another aspect of the present invention, there is provided, in a road vehicle having a combustion engine, an electric generating means driven by the combustion engine, a trolley means for collecting electricity from external power lines, an electric operating system including an electric traction motor propelling the vehicle, and selector means for selectively and alternatively connecting the electric generating means and the trolley means to the operating system for operating the traction motor, the improvement comprising:

a two speed drive axle connected to the traction motor, axle shifting means operatively connected to the selector means and the drive axle, and responsive to connection of the trolley means to the operating system to lock the drive axle in the high drive ratio.

The two-speed axle and lockout system limits the speed range of the vehicle to that allowing the effective use of trolleys. In the diesel mode, the low ratio can be used for high speed operation.

Preferably, the selection of diesel power automatically unlocks the axle. In the diesel mode, the axle may be inhibited from shifting to the high ratio at speeds above a selected low speed, say thirty miles per hour, to prevent interference with electric braking.

According to a further aspect of the present invention there is provided, in a road vehicle having a main source of power, a pressurized hydraulic system, a main pressure pump for pressurizing the hydraulic system and auxiliary systems operated by the hydraulic system:

pressure sensing means connected to the hydraulic system for measuring the pressure therein;

means for operating the main pressure pump to maintain a pre-determined operating pressure in the hydraulic system;

an auxiliary source of power;

an auxiliary pressure pump for pressurizing the hydraulic system;

an auxiliary control means operatively connected to the pressure sensing means, the auxiliary pressure pump and the auxiliary source of power for operating the auxiliary pump when system pressure drops below a pre-determined emergency minimum pressure and shutting off the auxiliary pump when the system pressure reaches a pre-determined emergency maximum pressure, the emergency minimum and the emergency maximum pressures being less than the minimum operating pressure.

This system maintains minimum pressure in such systems as power steering regardless of the condition of the main power supply.

According to a further aspect of the present invention, there is provided a heating system for a road vehicle comprising a combustion engine, an electric generating means driven by the combustion engine to provide electricity, an electric traction motor driven by the electricity and connected to driving wheels of the vehicle to propel the vehicle, said heating system comprising:

blower means for producing a flow of air into a compartment of the vehicle;

heat exchanger means for supplying heat to said flow of air;

electric heater means for supplying heat to said flow of air;

heat exchanger control means for selectively supplying the heat exchanger means with heated liquid coolant from the combustion engine;

switch means for alternatively connecting the electric heater means to the supply of electric power;

control means for controlling the heat exchanger control means and the switch and including a thermostatic means monitoring the temperature of the liquid coolant, said control means operative, in response to a coolant temperature lower than a predetermined temperature to operate said heat exchanger control means to discontinue the supply of coolant to the heat exchanger from the liquid coolant system and to operate said switch means to connect the electric heater to the supply of electric power, and operative in response to a temperature greater than said predetermined temperature to operate said heat exchanger control means and said switch means to supply the heat exchanger with liquid coolant and to disconnect the electric heater from the electric supply.

The dual heating system provides warm air immediately upon start-up of the vehicle, but switches to waste heat from the engine when it is available. This is particularly useful in dual mode vehicles where the engine may not be operated for long periods during trolley use.

According to another aspect, the present invention provides, in a road vehicle comprising a combustion engine with a liquid coolant system, an electricity generating means driven by the combustion engine, trolley means for receiving electricity from external power lines, an electric operating system for the vehicle, an electric motor means for propelling the vehicle and selector means for selectively and alternatively connecting the electric operating system and the motor means to the trolley means and the electricity generating means:

electric heater means associated with said combustion engine liquid coolant system for heating liquid coolant therein;

control means for connecting said engine heater means to the electric operating system of the vehicle to receive electricity therefrom in response to operation of the selector means to connect the trolley means to the electric operating system.

Thus, the engine is kept warm and ready for start-up when required.

A temperature sensor may be installed to monitor the temperature of the coolant and to connect the engine heater in response to a low coolant temperature.

BRIEF DESCRIPTION OF THE DRAWINGS

In the accompanying drawings, which illustrate an exemplary embodiment of the present invention.

DETAILED DESCRIPTION

Referring to the drawings, and particularly to FIGS. 1 through 4 there is illustrated an articulated bus 10 with a front section 12 and a back section 14 joined by an articulated coupling centered on the turntable 16. The two sections are joined by an accordian-type seal 18.

The front section 12 of the bus carries a traction motor 20 connected through a transfer box 22 to a drive axle 24 for driving the front bus section. The transfer box provides forward and reverse drive. The traction motor is a three phase AC motor driven by power from an inverter 26. The inverter is in turn supplied with power from either trolley poles 28 riding on overhead trolley lines or a diesel alternator set 30 located in the engine compartment at the back of the bus. Power is selected from either the trolley poles or the diesel alternator set by an input control unit 32.

Figure 1:
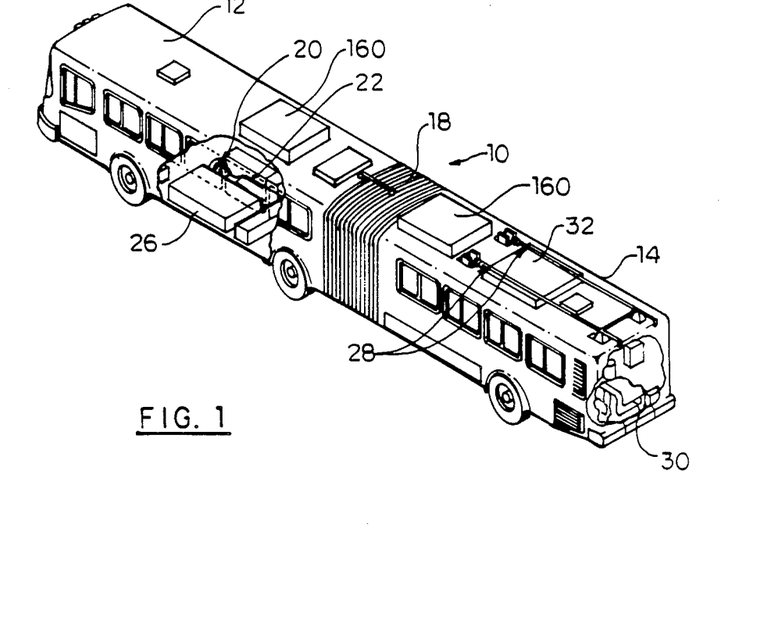
FIG. 1 is a perspective view of an articulated bus.
Figure 2:
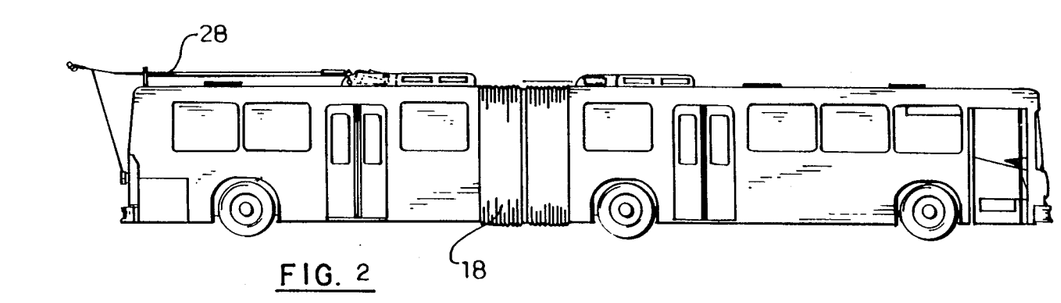
FIG. 2 is a side elevation of the bus.
Figure 3:
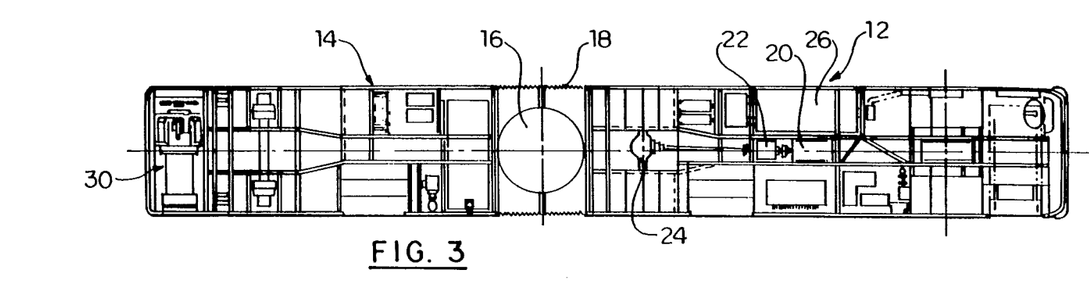
FIG. 3 is a plan view of the bus in section.
Figure 4:
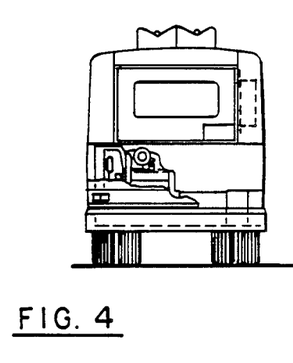
FIG. 4 is a rear elevation of the bus.
Figure 5:
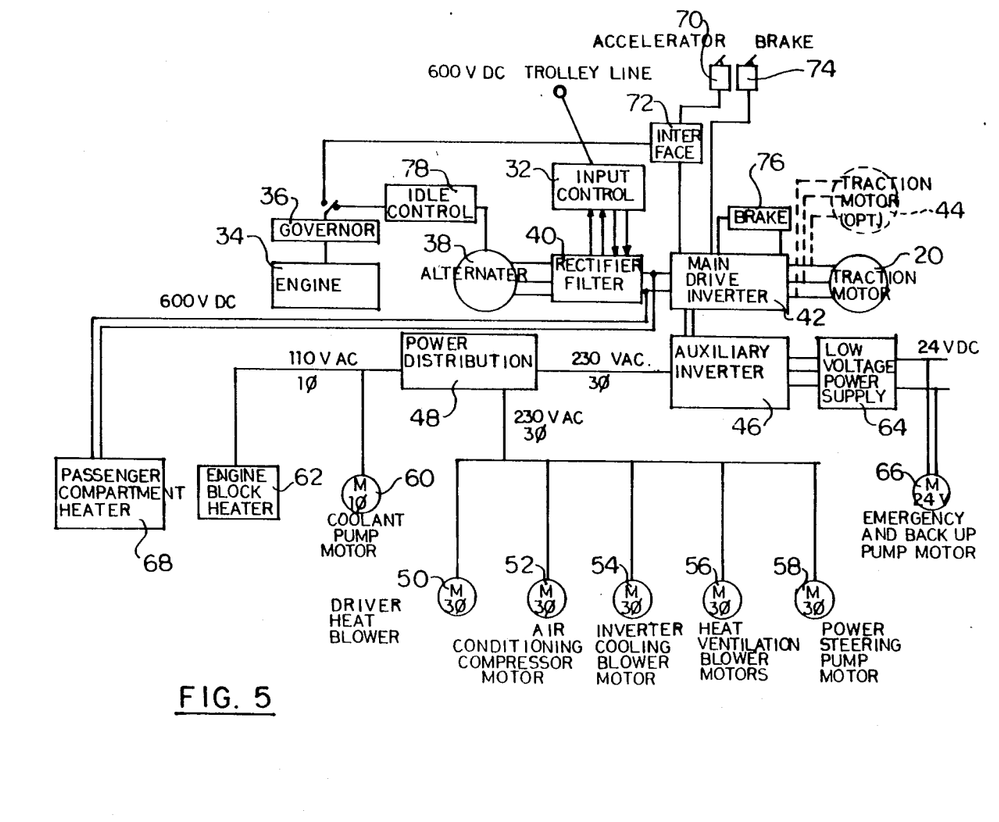
FIG. 5 is a block schematic of the power system of the bus.

A general schematic of the power system for the bus is illustrated in FIG. 5. This includes a diesel engine 34 controlled by a governor 36. The engine 34 is connected directly to a three phase alternator 38 supplying three phase AC power to a rectifier 40. The DC output of the rectifier is passed to the input control unit 32 which is a switching unit for selecting either the output from the alternator or the power derived from the controlling lines to power the operating systems. The input control unit 32 also incorporates fuses and a lightning arrester such as are normally found in trolley buses.

The DC power selected by the input control is passed to the main drive inverter 42 of the inverter unit 26. The main drive inverter 42 converts the DC power received into an AC power for driving the traction motor 20, and where used, an optional traction motor 44 that may power a second axle.

The inverter 26 also includes an auxiliary inverter 46 that converts the DC power received into a 230 volt AC, three phase current that is fed to a power distribution network 48. This distribution network supplies 230 volts AC, three phase power to several of the bus' operating systems, including a motor 50 for a driver's compartment heating and defrosting system, a motor 52 for an air conditioning compressor, where employed, a motor 54 which drives a cooling air blower for the inverter, motors 56, shown schematically as a single motor, for driving heat and ventilation blowers and a main power steering pump motor 58.

The power distribution network 48 also supplies 110 volts AC one phase power to a coolant pump motor 60 and an engine block heater 62.

The auxiliary inverter has an additional output connected to a low voltage power supply 64. This has a 24 volt DC output that is used as a battery charger and to power such conventional bus systems as lights and instruments. The 24 volt DC power is also used in the control system for the bus and to power an emergency and backup steering pump motor 66.

Passenger compartment heaters 68 are connected to the DC power link to the main drive inverter and are operated on the DC power supplied either from the trolley lines or the rectified alternator output.

The operator's controls for the bus include an accelerator transducer 70 which has an output to an interface circuit 72 which forms part of a feedback loop from the main drive inverter to the diesel engine governor. A brake transducer 74 has its output connected to the main drive inverter which acts, in response to a signal from the transducer to engage the brake resister 76 across the windings of the traction motor. An idle control circuit 78 is connected in a feedback loop between the alternator and the engine governor.

Figure 11:
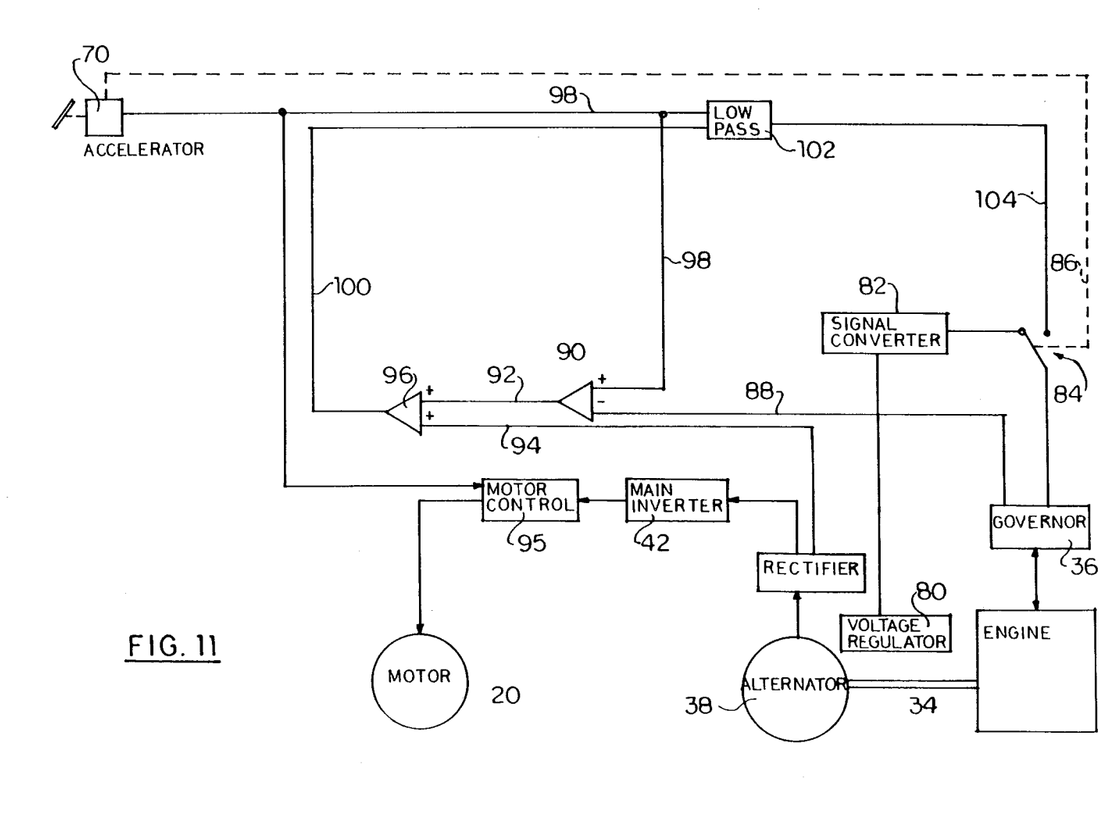
FIG. 11 is a schematic view of the engine control system.

The engine control system is more specifically illustrated in FIG. 11. As shown in that FIG., there is a voltage regulator 80 associated with the alternator 38 to increase the exciter field of the alternator under loaded conditions to maintain the required voltage from the alternator. This is a conventional arrangement. With this arrangement, as the alternator speed decreases, the field forcing required to maintain adequate voltage approaches the saturation curve of the alternator. Ultimately, the field forcing rises to the extent that the system protecting circuit breakers will trip and the system will shut down. When the alternator is driven by the diesel engine, this will occur well above the minimum operating speed of the engine. To allow the engine to idle at a lower speed while still allowing the use of auxiliary equipment, the voltage regulator is set to provide a field voltage output close to the saturation voltage at an engine speed selected to provide an appropriate amount standby electrical power without operation of all auxiliary systems. To accommodate increased power demand from the auxiliary systems, the voltage regulator output is fed to a signal converter 82 which generates a low speed control signal that is passed via a switch 84 to the engine governor 36. The governor then increases the speed of the engine and thence the alternator to accommodate the increased load.

The use of this idle feedback system allows the engine to idle at a lower speed, matching the desired power output for operating auxiliaries.

When the operator of the vehicle presses the accelerator pedal transducer to generate a command signal, the switch 84 is switched to its other contact so that the control signal to the governor is supplied from the accelerator interface feedback loop.

The governor 36 produces an engine power signal at line 88. This signal represents not only engine power but engine speed, as the engine is controlled by the governor 36 to operate on a fixed speed-power curve. The engine power signal 88 is subtracted from command signal 98 from the accelerator transducer 70 in a comparator 90. The resulting signal 92 is, if positive, added by a circuit 96 to an alternator load signal 94 representing the power transmitted through the DC link from the rectifier to the inverter. The result is feedback 100 that is supplied to a low pass circuit 102 along with the command signal 98. The circuit 102 passes whichever is the lowest of the command signal and the feedback for use as a control signal 104 for controlling the operation of the governor 36.

With this control system, on start up, the alternator is disconnected from all loads by a set of three phase contacters (not shown). The engine is then started and idles at a low, minimum idle speed. The system may then be put on standby by depressing a reset switch at the operator station. This applies power to the governor, setting the engine idle speed to a higher level and subsequently closing the three phase contacters linking the alternator to the rest of the electrical system. At this time the control signal for the governor is derived from the signal converter and the voltage regulator. As auxiliary loads are connected, for example, lights, heaters and the like, the idle feedback circuit consisting of the voltage regulator 80 and the signal converter 82 operates to increase the engine speed as necessary to match the electrical demand on the alternator without exceeding the field forcing parameters of the alternator.

When the accelerator pedal is pressed, a signal from the accelerator transducer operates the switch 84 and provides a control signal to the governor from the accelerator feedback loop. The signal 98 from the accelerator transducer 70 is compared with the engine power signal 88 from the governor 36 to produce a signal 92 that represents how much extra power the system is being commanded to provide over and above that available from the engine at its current state of operation. This signal 92 is then added to the alternator load signal 94 to produce a feedback signal 100 that will vary with the total electrical consumption of the vehicle.

In operation, depressing the accelerator increases the command signal 98 which will then be greater than the actual speed signal 88. This means that a positive signal 92 is supplied to the adder 96 along with a signal representing the actual electrical load on the system at the time. The resultant signal 100 will, under mean conditions of operation, that is level road with no head or tail wind, equal the command signal 98 so that the control signal to the governor equals the command signal. Under other conditions, such as a downhill slope, where the motor load on the electrical supply is reduced, the signal 94 will be comparably reduced, reducing the feedback signal 100, which will then be less than the command signal 98. The reduced feedback signal will be passed by the circuit 102 as the control signal to governor 36 so that the speed of engine 34 will be less than that produced by a control signal equivalent to the command signal 98.

In this way, the speed and power delivered by the engine 34 follows the power required of the engine to drive the alternator, resulting in a more efficient use of the engine than would otherwise be the case. The motor speed is dictated by the motor control circuitry 95 according to the command signal 98 from the accelerator transducer 70. This is in accordance with the previously referred to Stromberg system.

Figure 6:
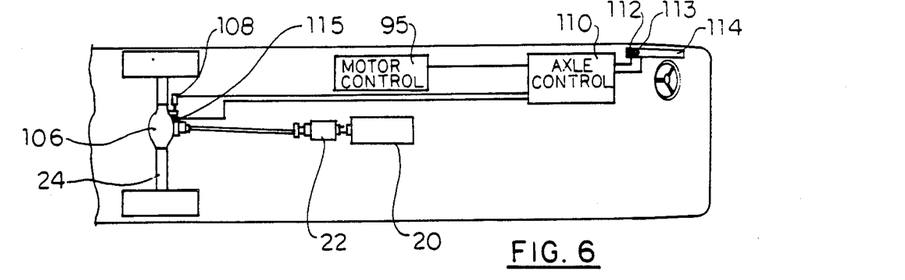
FIG. 6 is a schematic view of a control system for a two-speed axle.

Turning now to FIG. 6, there is illustrated a control system for a two speed differential 106 incorporated in the bus. The two speed differential is of conventional form such as that produced by Eaton Corporation as Model No. 26221.

The axle is shifted by a shifter mechanism 108, controlled by an axle control circuit 110. The axle control is linked to a selector switch 112 on a control panel 114 at the operator's station. The selector switch is used to select either trolley or diesel mode operation for the bus. The axle control is also connected to the motor control circuitry 95 to derive a signal representing the traction motor speed. In operation, use of the selector switch 112 to select trolley mode automatically shifts the differential 106 into a high ratio. This limits the maximum speed of the bus to that acceptable for reliable trolley operation. When diesel mode is selected by the switch 112, a second switch 113 on the control panel 114 may be used by the driver of the bus to select either low ratio or high ratio from the differential. When low ratio has been selected, shifting to high ratio cannot occur unless the vehicle speed, monitored from the motor control, falls below three miles per hour, when automatic shift to high ratio occurs. This prevents the momentary loss of power that could otherwise occur. During braking, also determined by reference to the motor control, shift is prevented regardless of speed.

In a shift to low ratio, traction power from the electric motor is automatically removed and slight electrical braking is applied to slow the motor to match the motor speed to the slower speed of the axle input in low ratio. The actual shift of the axle occurs when the tractive power is removed from the motor and a feedback signal from a switch 115 associated with the axle indicating that the shift has been completed causes reapplication of power to the traction motor.

Figure 7:
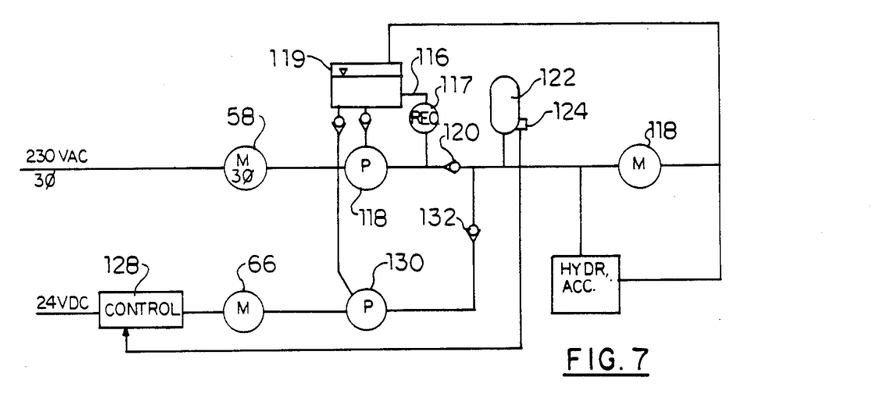
FIG. 7 is a schematic view of an hydraulic system control.

FIG. 7 of the accompanying drawings illustrates a dual hydraulic pressure system for maintaining hydraulic pressure to drive such things as a power steering motor 118 and other hydraulic accessories such as a wheel chair lift where fitted. The hydraulic pressure is normally maintained with a 230 volt three phase motor 58 driving a dump 118. The pump supplies hydraulic fluid through a check valve 120 to an accumulator 122. A bypass line 116 including a relief valve 117 is connected between the motor and a reservoir 119 to limit system pressure to a predetermined operating pressure. When the pressure falls below the operating pressure, the bypass 116 closes to increase the pressure in the system.

The emergency and backup hydraulic motor 66 drives a second hydraulic pump 130 through a check valve 132 into the hydraulic system, including accumulator 122. The motor 66 is driven by the 24 volt direct current supplied drawn either from the low voltage power supply of the vehicle or on board battery power. The operation of motor 66 is controlled by a control unit 128 in conjunction with a pressure sensor 124. When the pressure sensor senses a minimum emergency pressure, below the operating pressure, the control 128 will turn on the motor 66 and charge the system to an emergency pressure that is above the emergency minimum pressure yet still below the operating pressure. This ensures that adequate hydraulic pressure is maintained to provide emergency operation of the hydraulic systems, especially power steering.

Figure 8:
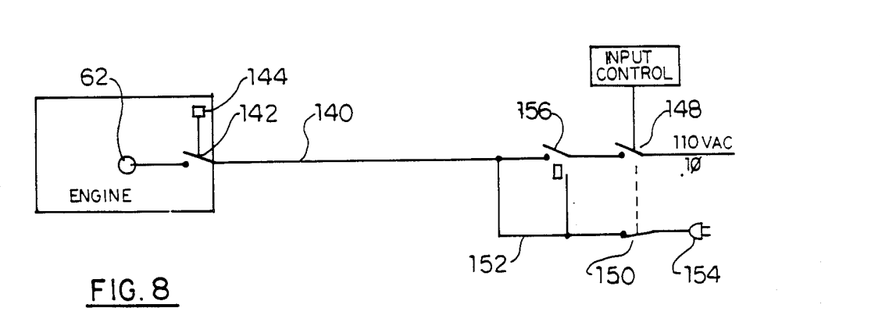
FIG. 8 is a schematic view of an engine heater control.

FIG. 8 of the accompanying drawings illustrates an engine heating system including an engine block heater of conventional form that operates on 110 volts AC, single phase. In the system illustrated in FIG. 8, the block heater is supplied with power through a power line 140. This contains a switch 142 controlled by a thermostat 144, so that the power line to the block heater is opened when the engine coolant is at the engine manufacturer's recommended temperature and closed below that temperature. The power line 140 is connected to a mains power line 152 with the usual mains power plug 154 for connecting the block heater to a conventional outlet in a garage or the like. The power line 140 itself is connected to the power distribution network 48 of the bus to deliver 110 volts AC single phase from that source. The two sources of power are isolated from one another by a set of contacts 148 in the power line 140 and a set of contacts 150 in the mains power line 152. The two sets of contacts are connected and operated so that one is closed and the other is open at any given time. The operating signal for the two sets of contacts is derived from the input control of the bus according to the selection of either trolley or diesel mode of operation. As an additional security factor, a relay operated switch 156 with its contacts 158 in the line 140 opens the line 140 from the onboard power supply when power is being supplied through the mains power line 152.

Figure 9:
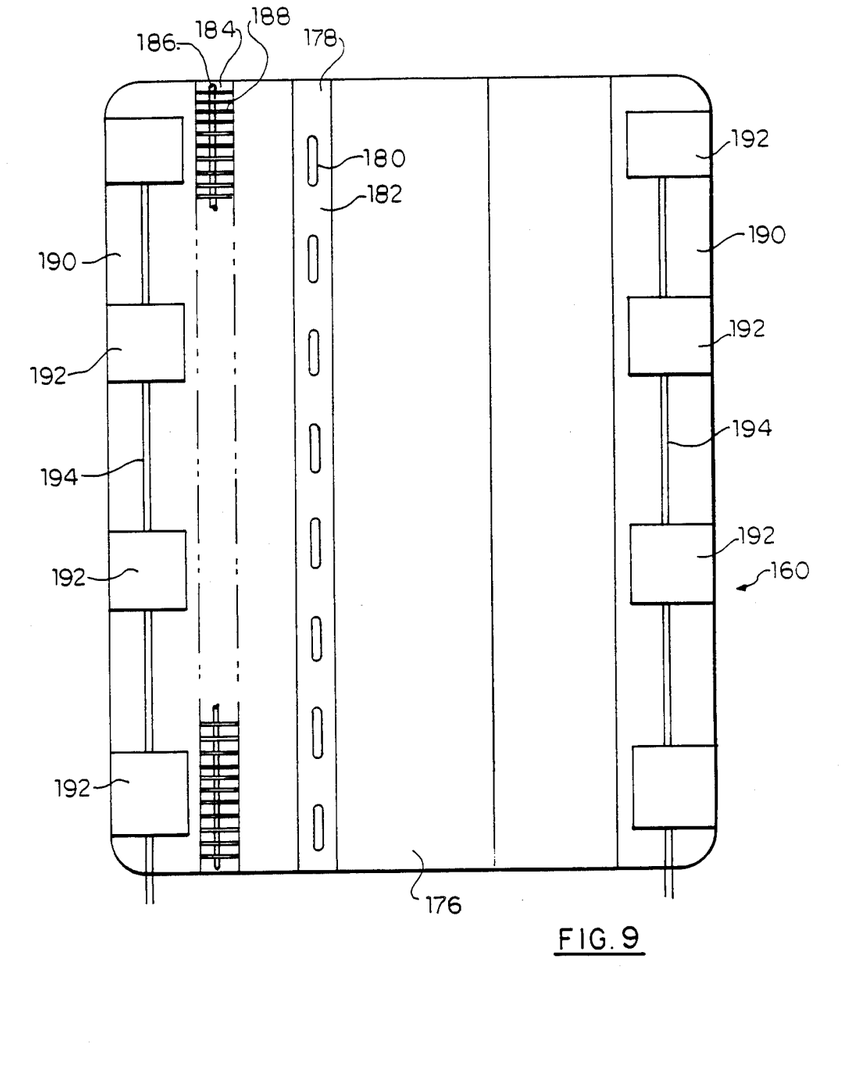
FIG. 9 is a plan view, partly in section of a passenger compartment heater.
Figure 10:
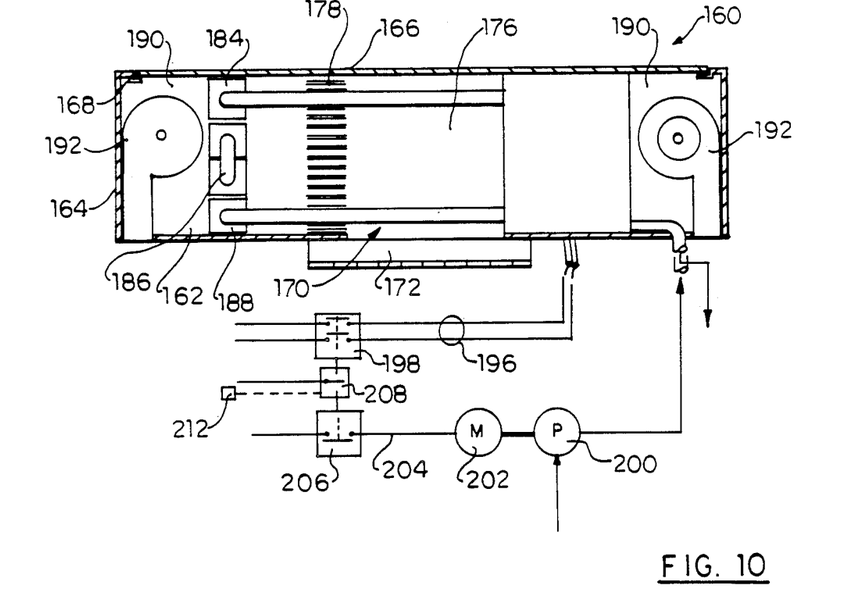
FIG. 10 is an elevation, partly broken away of the compartment heater.

The bus incorporates a dual passenger compartment heating system incorporating electric heaters and liquid to air heater exchangers. The system is illustrated in FIGS. 9 and 10. The passenger compartment heater 160 illustrated in that drawing is intended to be mounted on the roof of the bus. It is a shallow box-like housing with a base panel 162, side walls 164 and a cover 166 that seats on a peripheral flange 168. The heater housing has an elongated rectangular inlet 170 formed centrally in the base panel 162. This is covered by a filter 172 that is, in the installed condition of the heater, accessible from inside the bus. Above the inlet 170 is an elongate inlet plenum 176 that is bounded on either of its long sides by an electric heater 178 that includes a heating element 180 and associated heat transfer of fins 182. Outside the electric heater 178 is a liquid to air heat exchanger 184. The heat exchanger consists of the usual liquid tubes 186 with associated fins 188. Outside the heat exchangers are outlet plenums 190 that accommodate centrifugal blowers 192, four on each side, with a common operating shaft 194.

The electric heaters 178 are supplied with power by a DC power lines 196 through a switch 198. The heat exchangers are supplied with engine coolant by a coolant pump 200 driven by a motor 202. The motor itself is driven by power supplied through a line 204 that may be opened or closed with a switch 206. Either the electric or the liquid to air heat source may be selected by means of a switch 208 that closes either switch 198 or switch 206 depending on the signal received from a thermostat 212 sensing the engine coolant temperature. When the engine coolant temperature is below that necessary to provide adequate heat, the electric heaters are switched on, while adequate coolant temperature for heating purposes causes the electric heaters to be disconnected and the motor 202 to be switched on. The blowers 192 draw air from the cutlet plenums 190 and discharge it into distribution ducts to appropriate locations in the passenger compartment. Where desired, both electrical heaters and the liquid to air heat exchangers may be disconnected and fresh air may be supplied to the outlet plenum 190 through to an appropriate damper arrangement.

While the invention has been described in the foregoing in association with an articulated, dual mode bus, it is to be understood that the various aspects of the inventions are not limited to such an application. Aspects of the invention are applicable to single mode diesel-electric systems, to systems using other kinds of combustion engines, and in some cases to stationary installations. The invention is thus to be considered limited only by the scope of the appended claims.

I claim:

1. A control system for controlling an electric generating apparatus including a combustion engine and an electricity generating means driven by the combustion engine, said control system comprising:

an engine governor means responsive to a control signal for controlling the operation of the engine;

a command signal generator generating a selectively variable command signal;

an engine power signal generating means for generating an engine power signal representing power available from the engine;

an electric power demand monitoring means generating a power demand signal representing the electric power being supplied by the electricity generating means to other equipment;

first comparing means for comparing the engine power signal and the command signal and producing an engine power deficiency signal representing the difference between engine power available and electric power required by the command signal;

second comparing means for combining the engine power deficiency signal with the power demand signal and generating a feedback signal;

selector means comparing the command signal and the feedback signal and passing whichever signal is the lowest to the engine governor means as the control signal.

2. A control system according to claim 1 wherein the electricity generating means is an alternator with a field-forcing voltage regulator producing an exciter control voltage, and including a signal converter for converting the exciter control voltage to a low speed control signal, means responsive to the absence of a command signal for connecting the signal converter to the governor to supply the low speed control signal thereto as a control signal.

* * * * *